United States Patent
Ito et al.

(10) Patent No.: US 6,938,679 B1
(45) Date of Patent: *Sep. 6, 2005

(54) HEAT TRANSPORT APPARATUS (75) Inventors: Calvin H. Ito, West Hills, CA (US); Nigel C. Rowe, Fountain Valley, CA (US)

(73) Assignee: The Boeing Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,118

(22) Filed: Sep. 15, 1998

(51) Int. Cl.$^7$ .............................................. F28D 15/00
(52) U.S. Cl. ..................... 165/104.21; 165/41
(58) Field of Search ................ 165/41, 104.26, 165/104.21, 104.33, 80.4, 80.3, 185, 104.14; 361/700, 687; 257/715; 244/158 R, 163

(56) References Cited

U.S. PATENT DOCUMENTS

| | | | | | |
|---|---|---|---|---|---|
| 3,143,592 A | * | 8/1964 | August | .................... | 361/700 X |
| 3,831,664 A | * | 8/1974 | Pogson | ................... | 165/104.14 |
| 4,738,304 A | * | 4/1988 | Chalmers et al. | .......... | 165/41 X |
| 5,036,905 A | * | 8/1991 | Eninger et al. | ................ | 165/41 |
| 5,111,874 A | * | 5/1992 | Kosson | .............. | 165/104.26 X |
| 5,303,768 A | * | 4/1994 | Alario et al. | ........... | 165/104.26 |
| 5,332,030 A | * | 7/1994 | Spencer et al. | ............ | 165/41 X |
| 5,358,033 A | * | 10/1994 | Schlitt | ..................... | 165/104.26 |
| 5,682,943 A | * | 11/1997 | Yao et al. | .............. | 165/104.21 |
| 5,743,325 A | * | 4/1998 | Esposto | ........................ | 165/41 |
| 5,806,803 A | * | 9/1998 | Watts | ......................... | 165/41 X |
| 5,842,513 A | * | 12/1998 | Maciaszek et al. | ..... | 165/104.26 |
| 5,944,092 A | * | 8/1999 | Van Oost | ................ | 165/104.26 |
| 5,950,710 A | * | 9/1999 | Liu | ..................... | 165/104.26 X |
| 5,959,837 A | * | 9/1999 | Yu | ...................... | 165/104.33 X |

FOREIGN PATENT DOCUMENTS

| | | | | | |
|---|---|---|---|---|---|
| FR | 2463058 | * | 3/1981 | ................... | 165/41 |
| JP | 0100394 | * | 6/1984 | ............ | 165/104.14 |
| JP | 0083586 | * | 4/1988 | ............ | 165/104.14 |
| JP | 401102293 | * | 4/1989 | ............ | 165/104.14 |
| JP | 0146498 | * | 6/1990 | ............ | 165/104.26 |
| JP | 404297789 | * | 10/1992 | ................. | 165/185 |

* cited by examiner

*Primary Examiner*—Allen Flanigan
(74) *Attorney, Agent, or Firm*—John A. Artz; Artz & Artz (57) ABSTRACT

A heat transport apparatus comprises an evaporator saddle having a pair of bores for housing two evaporators. The apparatus also comprises a condenser saddle having a pair of bores defining two condensers. One embodiment comprises a first loop heat pipe having a first condenser in fluid communication with a first evaporator, and a second loop heat pipe having a second condenser in fluid communication with a second evaporator. The two loop heat pipes share a single evaporator saddle and a single condenser saddle. A continuous conductance heat pipe may be placed in contact with either the evaporator saddle or the condenser saddle.

12 Claims, 5 Drawing Sheets

HEAT TRANSPORT APPARATUS

BACKGROUND OF THE INVENTION

The present invention is directed generally to heat transport systems. More particularly, the present invention is directed to heat transport apparatus having loop heat pipes.

A disadvantage of using a heat transport system having only a single loop heat pipe is that failure of that pipe would greatly impact operation. In many space applications in particular, there would be no backup system to transport heat. A solution to the problem of failure of a single pipe is redundancy.

Redundant designs are of particular value for space applications because the space environment can be very harsh. For example, there is potential for damage to or failure of parts due to micrometeoroids. Also, the longevity of space craft missions (typically 15 years) without the possibility of servicing in geosynchronous orbit makes reliability critical.

Conventional redundancy in the case of loop heat pipes, however, requires apparatus that is heavy, large, and expensive to manufacture.

Some loop heat pipes comprise an evaporator and a condenser, both of which have a saddle. In some typical single loop heat pipe systems, the evaporator saddle has four flanges and the condenser saddle has two flanges. A conventional redundant heat transport apparatus has two loop heat pipes for redundancy. The apparatus has first and second evaporator saddles for the first and second loop heat pipes, respectively. Also, the apparatus has first and second condenser saddles for the first and second loop heat pipes, respectively. Conventional redundant heat transport apparatus comprising two typical single loop heat pipes thus have a total of eight flanges associated with the evaporator saddles and a total of four flanges associated with the condenser saddles, the flanges being very heavy and consuming a lot of space.

Redundancy, minimum weight, and small mechanical envelope (i.e., small volume or space consumption) are particularly desirable in space applications. Thus, there is a need for a redundant heat transport apparatus which has reduced weight and requires less space than a conventional redundant heat transport apparatus. There is also a need for redundant heat transport apparatus having reduced manufacturing costs.

Heat transfer apparatus having redundant constant conductance heat pipes (CCHPs), also called fixed conductance heat pipes (FCHPs), have been utilized in space applications. Such apparatuses comprise an evaporator saddle that accommodates two evaporators, and a condenser saddle that accommodates two condensers. The redundant CCHP (or FCHP) only has four flanges extending from the evaporator saddle and two flanges extending from the condenser saddle.

However, CCHPs have grooves extending longitudinally on the inner surface of the pipes which make the pipes rigid. Also, CCHPs are orientation sensitive and do not function very effectively in gravity. Thus, there is a need for a flexible redundant heat transport apparatus. There is also a need for a heat transport apparatus suitable for applications, such as terrestrial applications, where there is gravity.

SUMMARY OF THE INVENTION

The aforementioned disadvantages of conventional heat transfer devices are overcome using a heat transport apparatus in accordance with the present invention. In particular, the apparatus for transporting heat comprises a first loop heat pipe having a first evaporator and a first condenser, a second loop heat pipe having a second evaporator and a second condenser, an evaporator saddle having a first bore housing the first evaporator and a second bore housing the second evaporator, and a condenser saddle having a first bore and a second bore.

The apparatus may include a first reservoir in fluid communication with the first evaporator and a second reservoir in fluid communication with the second evaporator. The evaporator saddle may comprise four flanges and the condenser saddle may comprise two flanges.

The evaporator saddle may comprise a substantially flat surface, and the bores in the evaporator saddle may be disposed so that a plane bisecting both bores is substantially parallel to the flat surface of the evaporator saddle. Alternatively, the bores of the evaporator saddle may be disposed so that a plane bisecting both bores is substantially perpendicular to the flat surface of the evaporator saddle.

The apparatus may include a continuous cooling heat pipe disposed in contact with a surface of the evaporator saddle or a surface of the condenser saddle. The apparatus may include a plurality of condenser saddles in contact with the evaporator saddle. Additionally or alternatively, the apparatus may comprise a plurality of evaporator saddles in contact with the condenser saddle.

The apparatus may be used to transport heat in a spacecraft having a heat source and a radiator. In such a case, the evaporator saddle may be placed in contact with the heat source, and the condenser saddle may be placed in contact with the radiator.

DETAILED DESCRIPTION OF THE INVENTION

Figure 1:
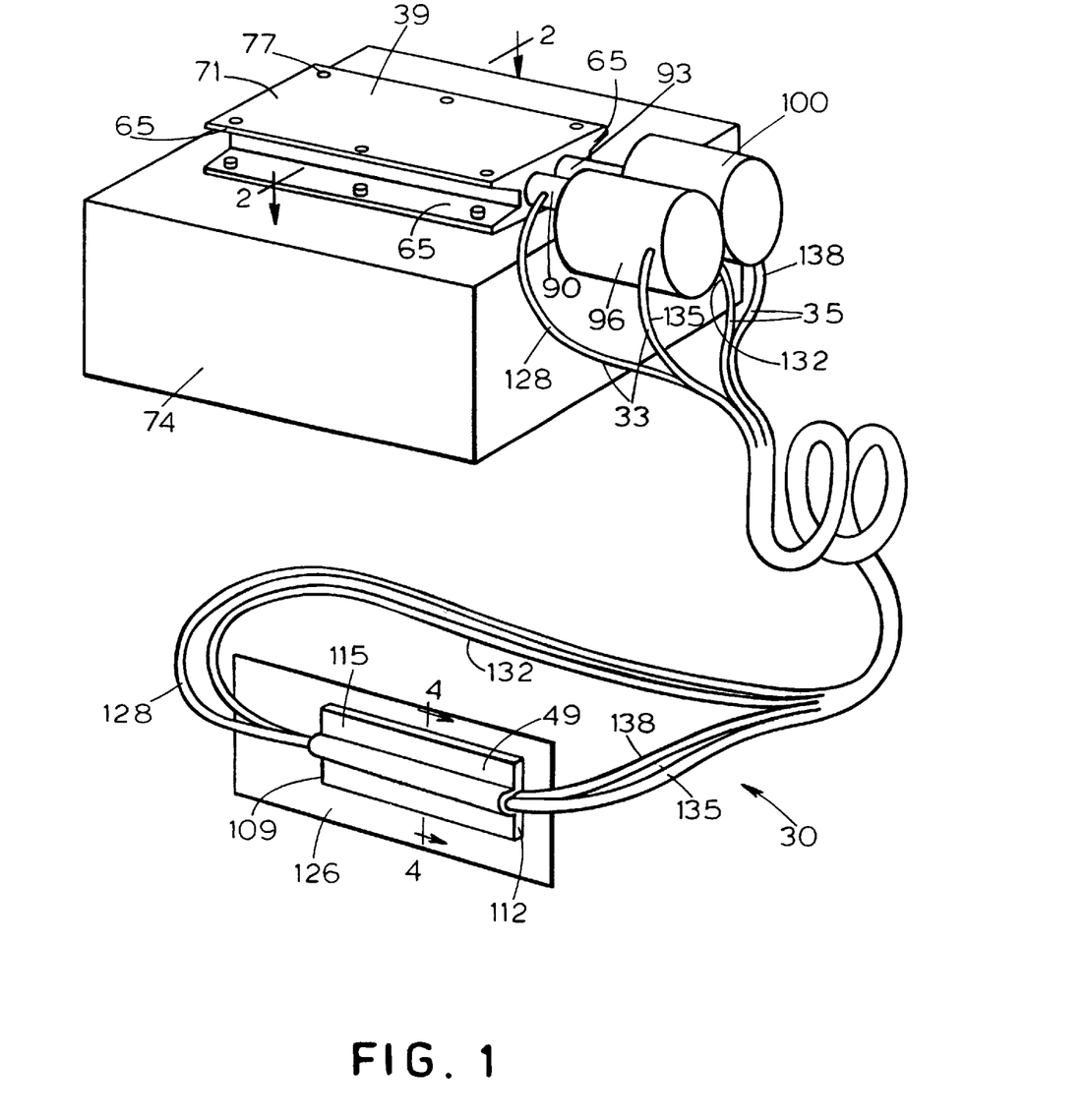
FIG. 1 is a perspective of a heat transfer apparatus in accordance with the present invention.

A heat transport apparatus in accordance with the present invention is shown in FIG. 1 and is designated generally at 30. The apparatus 30 comprises first and second loop heat pipes (LHPs) 33, 35. The apparatus 30 provides functional redundancy in case of failure of one of the LHPs, thereby requiring little or no maintenance to continue operation after such failure. The apparatus 30 and the LHPs 33, 35 are described in more detail below. U.S. Pat. No. 4,515,209, which is hereby incorporated by reference, also describes loop heat pipes in detail.

Figure 4:
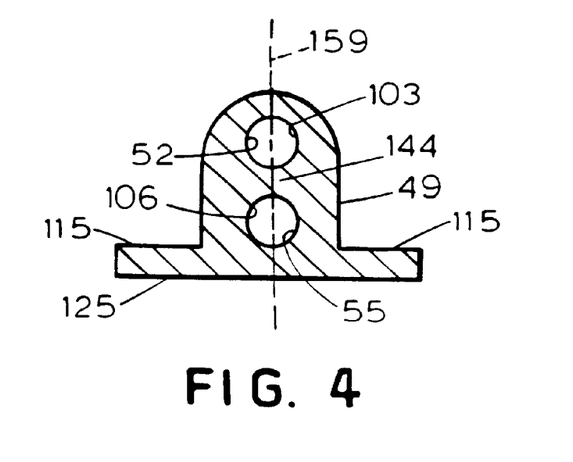
FIG. 4 is a sectional view of a condenser saddle taken through line 4—4 in FIG. 1.

One embodiment of the present invention provides functional redundancy by providing a single evaporator saddle 39 that accommodates at least two evaporators 43, 46 (FIG. 2), and a single condenser saddle 49 that accommodates at least two condensers 52, 55 (FIG. 4). The evaporator saddle 39 and the condenser saddle 49 reduce weight, mechanical envelope (i.e., volume or space consumption), and manufacturing costs compared to heat transfer systems employing an evaporator saddle and a condenser saddle for each of two independent loop heat pipes in order to achieve redundancy.

Figure 2:
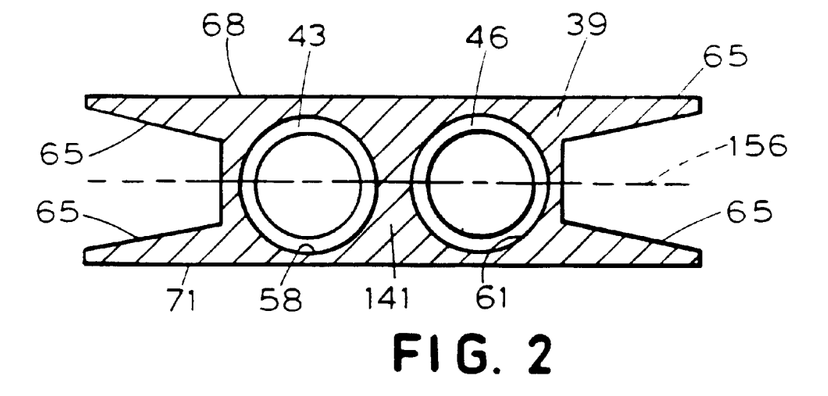
FIG. 2 is a sectional view of an evaporator saddle taken through line 2—2 in FIG. 1.

As seen in FIG. 2, the evaporator saddle 39 has first and second bores 58, 61 which house the first and second evaporators 43, 46, respectively. Evaporators 43, 46 are shown schematically in FIG. 2. The evaporator saddle 39 further comprises four flanges 65, a first substantially flat surface 68, and a second substantially flat surface 71 opposing the first substantially flat surface 68. The flanges 65 are for mounting the evaporator saddle 39 to a heat source 74 (FIG. 1) such as an electronic unit or to other structures. Holes 77 (FIG. 1) may be placed in the evaporator saddle 39 to accommodate fasteners (not shown).

One reason that the evaporator saddle 39 has the flanges 65, as opposed to an evaporator saddle that has a rectangular cross-section, is reduced weight. Also, for a given weight, contact area is increased by the flanges 65, thereby increasing the ease of heat flow.

Figure 3:
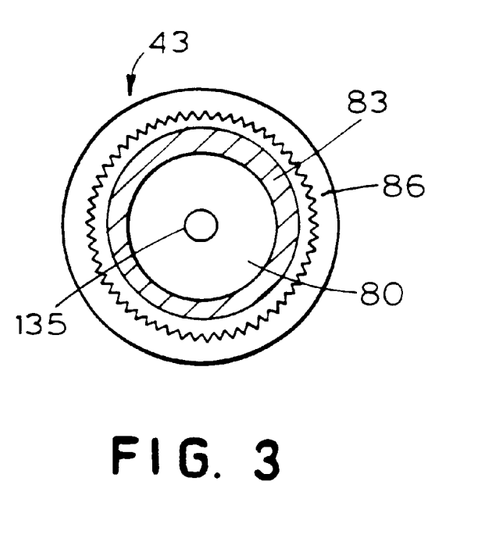
FIG. 3 is a sectional view of an evaporator.

As seen in FIG. 3, the first evaporator 43 comprises a liquid core 80 surrounded by a cylindrical wick 83 having pores (not shown). A vapor collection manifold 86 is placed around the exterior of the wick 83 and has circumferential threads (not shown) on its inner surface as well as longitudinal grooves (not shown) on its inner surface. The evaporator 46 may be similar to the evaporator 43.

At one end of each of the first and second evaporator saddle bores 58, 61 are respective first and second transition section pipes 90, 93. The first and second transition section pipes 90, 93 terminate at first and second reservoirs 96, 100, respectively. The reservoirs 96, 100 are also called compensation chambers. The compensation chambers 96, 100 accommodate fluid that has overflowed. Overflow occurs because the fluid is in a liquid state when the LHPs 33, 35 are first filled and, as some of the liquid vaporizes in the LHPs, some of the liquid is displaced by the vapor and flows into the compensation chambers 96, 100.

The transition sections 90, 93 provide a space between the compensation chambers 96, 100 and the evaporators 43, 46. During operation, the compensation chambers 96, 100 operate at a temperature that is a few degrees cooler than the evaporators 43, 46 and it is necessary to keep them spaced slightly apart from one another.

The condenser saddle 49 comprises first and second bores 103, 106 (FIG. 4) for passing heat transport fluid from a first end 109 (FIG. 1) of the condenser saddle 49 to a second end 112 (FIG. 1) of the condenser saddle 49. The first and second condensers 52, 55 are located in the first and second condenser saddle bores 103, 106, respectively. In some embodiments, the first and second condenser bores 103, 106 define the first and second condensers 52, 55, respectively. The inner surface of the condenser saddle 49 where the condensers 52, 55 are defined is generally smooth. As seen in FIG. 4, the condenser saddle 49 has two flanges 115 and a substantially flat surface 125. The flat surface 125 may be mounted to a radiator 126 (FIG. 1) such as a sheet of aluminum.

The following is a list of suitable materials for various parts of the present invention. The evaporator saddle 39 and the condenser saddle 49 may be composed of aluminum. The transition sections 90, 93 and the compensation chambers 96, 100 may be composed of stainless steel. The wicks 83 may be composed of nickel, titanium, or polyethylene. The vapor collection manifold 86 may be composed of stainless steel.

The first loop heat pipe 33 is the primary loop heat pipe 33, and the second loop heat pipe 35 is the redundant loop heat pipe 35. Either LHP may be designated the first or primary LHP 33, the other LHP being the second or redundant LHP 35. All of the components of the first or primary loop heat pipe 33 will be designated as the first of that component (e.g., the first wick; the first compensation chamber). Similarly, all of the components of the second or redundant loop heat pipe 35 will be designated as the second of that component (e.g., the second wick; the second compensation chamber).

First and second flexible vapor transport lines 128, 132 (FIG. 1) extend, respectively, from the first and second transition sections 90, 93 to the first end 109 of the condenser saddle 49. First and second flexible liquid return lines 135, 138 (FIG. 1) extend from the second end 112 of the condenser saddle 49 to the first and second compensation chambers 96, 100, respectively. Thus, the first evaporator 43 is in fluid communication with the first condenser 49, and the second evaporator 46 is in fluid communication with the second condenser 55. The flexible liquid return lines 135, 138 and vapor transport lines 128, 132 may be conventional and may be composed of aluminum or stainless steel.

The vapor transport lines 128, 132 may be welded to the first end 109 of the condenser saddle 49, and the liquid return lines 135, 138 may be welded to the second end 112 of the condenser saddle 49. Alternatively, the first liquid return line 1 35 and the first vapor transport line 128 may be a single tube that passes through the condenser saddle 49. Similarly, the second liquid return line 138 and the second vapor transport line 132 may be a single tube that passes through the condenser saddle 49.

Figure 5:
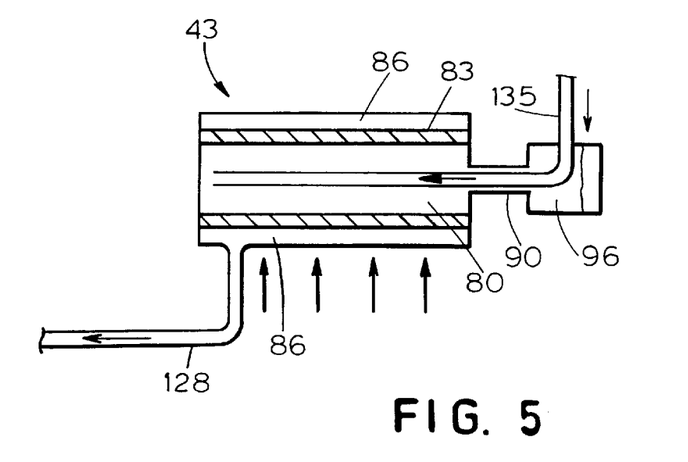
FIG. 5 is a fragmentary, side elevational view, partially in section, of an alternative embodiment of the present invention.

In the alternative embodiment shown in FIG. 5, the first vapor transport line 128 may be connected to the vapor collection manifold 86 of the first evaporator 43 rather than to the first transition section 90. Although not shown, the second vapor transport line 132 may be connected to the vapor collection manifold 86 of the second evaporator 46 rather than to the second transition section 93.

The first and second liquid return lines 135, 138 extend through the respective compensation chambers 96, 100 and into the respective evaporators 43, 46. Thus the liquid is guided by the liquid return lines 135, 138 as the liquid passes through the compensation chambers 96, 100 and the transition sections 90, 93.

The following description of heat transport fluid flow through the first loop heat pipe 33 is applicable to the second loop heat pipe 35 as well, however, for ease of illustration, only the first loop heat pipe cycle is discussed. Ammonia or some other heat transport fluid is in a liquid state as it enters the first bore 58 of the evaporator saddle 39. While in the first bore 58, the heat transport fluid absorbs heat from the heat source 74 which may be an electronic unit that contacts the evaporator saddle 39. The heat transport fluid vaporizes, passing through pores (not shown) in the first wick 83 and collecting in the vapor collection manifold 85. The vapor then (1) exits the evaporator 43 through the first vapor transport line 128 and flows toward the condenser 52 (FIG. 5 embodiment) or (2) exits the evaporator 43 and passes through the first transition section 90, enters the first vapor transport line 128 and flows toward the condenser 52. The first wick 83 generates capillary pumping pressure which creates flow through the first loop heat pipe 33.

After entering the first end 109 of the condenser saddle 49, the vapor is cooled into a liquid state. The liquid exits second end 112 of the condenser saddle 49 and travels in the first liquid return line 135 toward the first compensation chamber 96.

After passing through the first compensation chamber 96 and the first transition section 90, the liquid enters the first bore 58 of the evaporator saddle 39, where the cycle begins again.

As seen in the cross-section of the evaporator saddle 39 in FIG. 2, the evaporator saddle 39 has a wall 141 that separates the first and second evaporators 43, 46. Thus the ammonia that passes through the first evaporator 43 also passes through the first liquid return line 135 and the first vapor transport line 128. Similarly, ammonia that passes through the second evaporator 46 passes through the second liquid return line 138 and the second vapor transport line 132.

A wall 144 (FIG. 4) in the condenser saddle 49 prevents fluid that passes from the first vapor transport line 128 to the first liquid return line 135 from mixing with fluid that passes from the second vapor transport line 132 to the second liquid return line 138. Ammonia passing through the first LHP 33 is isolated from the second LHP 35. Thus, ammonia passing through the second LHP 35 remains confined to the second LHP 35. The first and second LHPs 33, 35 can both operate simultaneously.

It is this isolation of the loop heat pipes 33, 35 from one another that provides for redundancy. If either the first or second reservoir 96, 100 were to fail, for example, the other loop heat pipe would be virtually unaffected by that failure. The same is true if a part other than the reservoir were to fail in one of the loop heat pipes 33, 35.

As seen in FIG. 2, the evaporator saddle 39 only requires four flanges 65 because the evaporator saddle 39 has the first and second bores 58, 61, one for accommodating the first evaporator 43, and the other for accommodating the second evaporator 46. Also, the condenser saddle 49 only requires two flanges 115 because the condenser saddle 49 has the first and second bores 103, 106 for passing fluid from the vapor transport lines 128, 132 to the liquid return lines 135, 138, respectively. In contrast, an evaporator saddle in a conventional heat transport apparatus has four flanges and houses only a single evaporator. Consequently, those conventional redundant heat transport apparatuses employing two loop heat pipes have a total of eight flanges (four flanges from each of two evaporator saddles) rather than four flanges.

Weight is reduced and the mechanical envelope is reduced by incorporating a single evaporator saddle (the evaporator 39) that accommodates a pair of evaporators (the evaporators 43, 46) and, therefore, eliminates four flanges. Such weight reduction can be particularly important in space applications. The evaporator saddle 39 is estimated to weigh about 35% less than two independent evaporator saddles. Similarly, a single condenser saddle (the condenser saddle 49) having two bores (the bores 103, 106), eliminates two flanges. The condenser saddle 49 is estimated to weigh about 35% less than two independent condenser saddles and the mechanical envelope is reduced by the condenser saddle 49.

Apparatus in accordance with the present invention could be utilized wherever LHPs are used, including terrestrial applications (e.g., solar collectors, electronics, and refrigeration devices), aircraft applications and missile applications.

Figure 6:
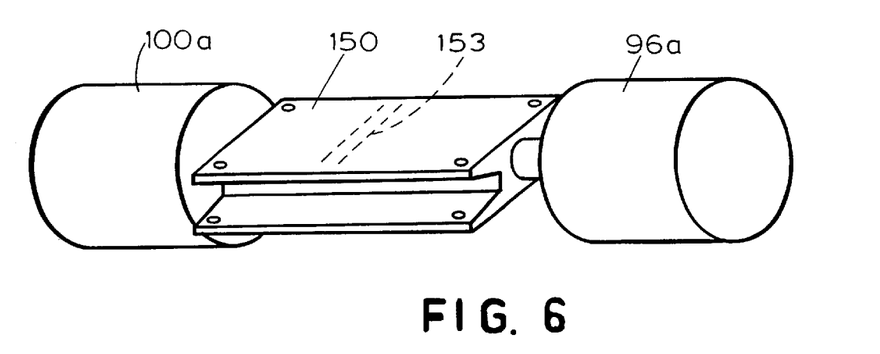
FIG. 6 is a fragmentary perspective of another embodiment of the present invention.

FIG. 6 depicts an alternative embodiment in which a first compensation chamber 96a and a second compensation chamber 100a are attached to opposing sides of an evaporator saddle 150. A wall 153 in the middle of the evaporator saddle 150 separates the ammonia of the first loop heat pipe 33 from the ammonia of the second loop heat pipe 35. The configuration of the condenser saddle (not shown) in this embodiment may be similar to the configuration of the condenser saddle 49 in the embodiment of FIG. 1.

As seen in FIG. 2, the first and second bores 58, 61 of the evaporator saddle 39 may be disposed so that a plane 156 bisecting both bores is substantially parallel to the first substantially flat surface 68 of the evaporator saddle 39.

As seen in FIG. 4, the first and second bores 103, 106 of the condenser saddle 49 may be disposed so that a plane 159 bisecting both bores is substantially perpendicular to the substantially flat surface 125 of the condenser saddle 49.

Figure 7:
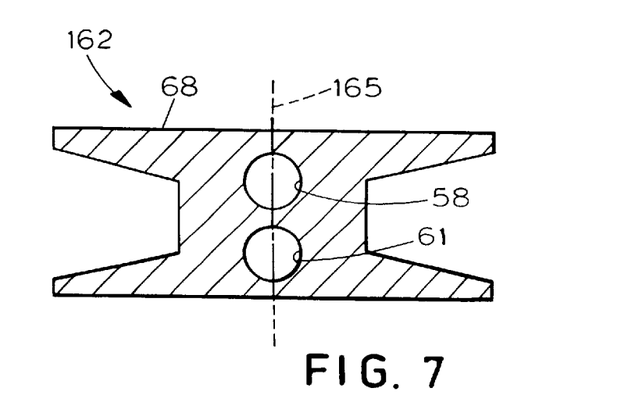
FIG. 7 is a sectional view of an evaporator saddle in accordance with another embodiment of the present invention.

FIG. 7 depicts an evaporator saddle 162 that defines the first and second bores 58, 61 in an orientation in which a plane 165 bisecting both bores is substantially perpendicular to the first substantially flat surface 68 of the evaporator saddle 162.

Figure 8:
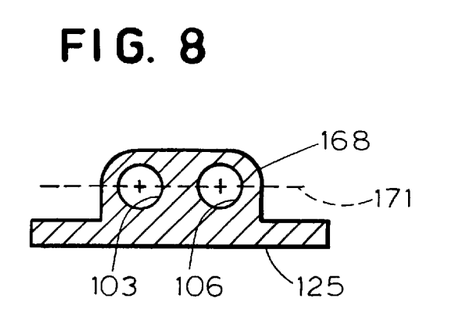
FIG. 8 is a sectional view of a condenser saddle in accordance with another embodiment of the present invention.

FIG. 8 depicts a condenser saddle 168 that defines the first and second bores 103, 106 in an orientation in which a plane 171 bisecting both bores is substantially parallel to the substantially flat surface 125 of the condenser saddle 168.

Figure 9:
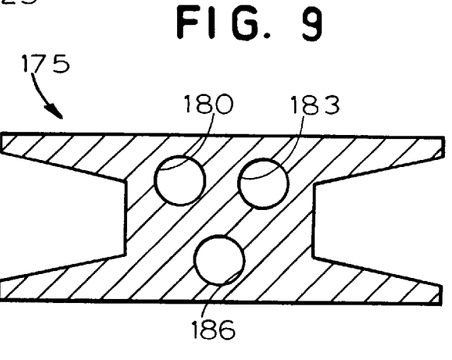
FIG. 9 is a sectional view of an evaporator saddle in accordance with still another embodiment of the present invention.

In another embodiment, shown in FIG. 9, an evaporator saddle 175 comprises three bores, bores 180, 183, 186. The bores 180, 183, and 186 each house an evaporator (not shown). If desired, more than three bores, and therefore more than three evaporators, may be placed in an evaporator saddle to increase the number of loop heat pipes in the apparatus 30 and, thereby, increase redundancy and increase heat transfer capability of the apparatus 30. Similarly three or more bores may be disposed in a condenser saddle so that three or more condensers may be located in a single condenser saddle, thereby increasing the redundancy and heat transfer capability of the apparatus 30.

It should be noted that although the number of evaporators in the apparatus 30 typically equals the number of condensers in the apparatus 30, the number of evaporator saddles need not be equal to the number of condenser saddles in a particular embodiment. For example, the apparatus 30 may comprise an evaporator saddle having three evaporators, a first condenser saddle having one condenser, and a second condenser saddle having two condensers.

Figure 10:
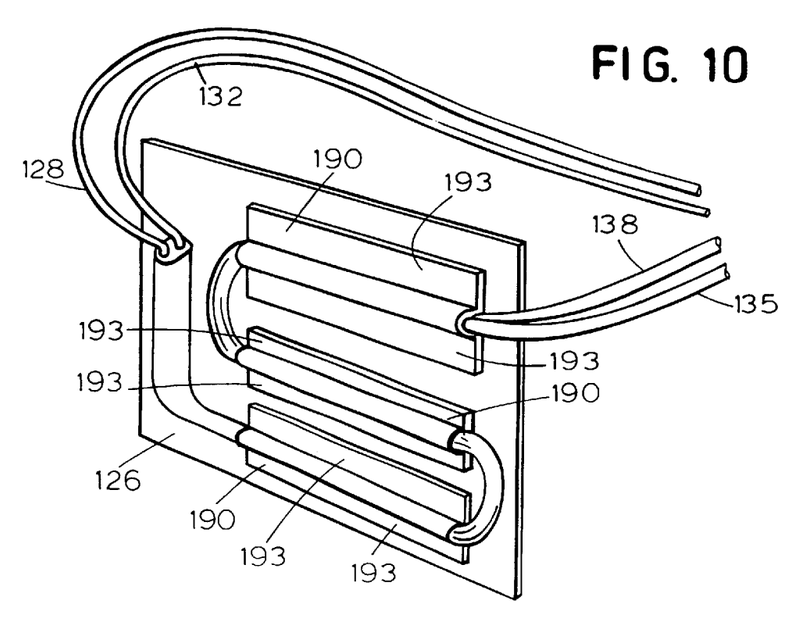
FIG. 10 is a perspective of an alternative condenser saddle arrangement in accordance with the present invention.

Referring to FIG. 10, an alternative condenser saddle arrangement comprises a plurality of condenser saddles 190 each having a pair of flanges 193. Each of the condenser saddles 190 may be similar to any of the condenser saddles discussed above.

Figure 11:
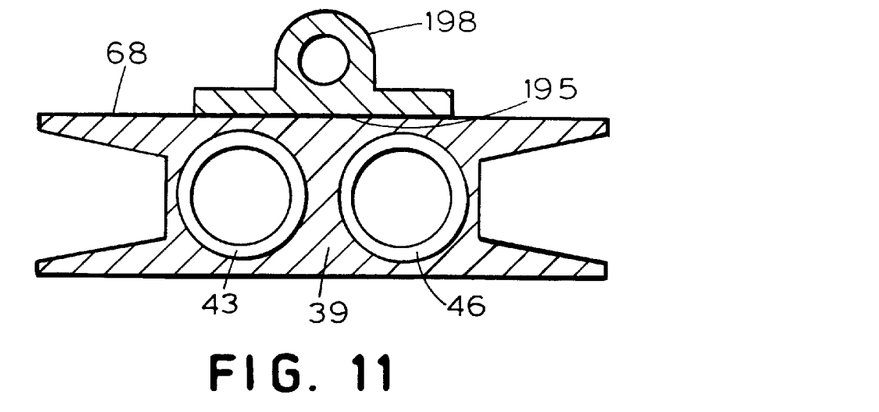
FIG. 11 is a sectional view of an evaporator saddle similar to the evaporator saddle of FIG. 2 and shown in contact with a constant conductance heat pipe.
Figure 12:
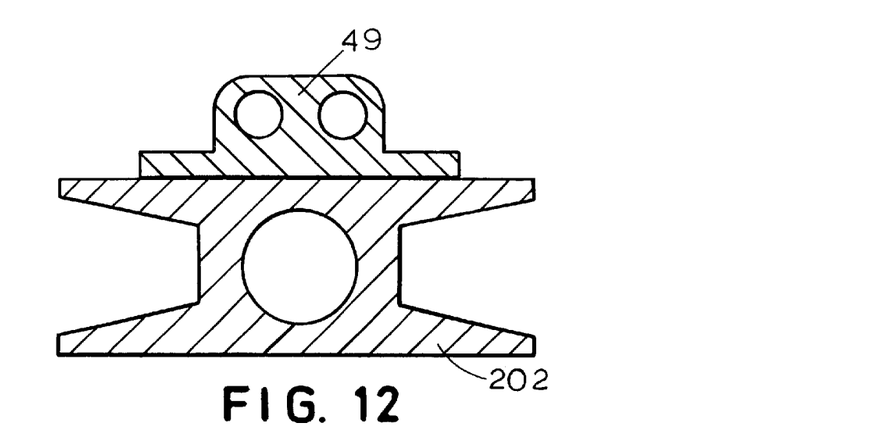
FIG. 12 is a sectional view of a condenser saddle shown in contact with a constant conductance heat pipe.

Heat transport apparatus according to the present invention may include a part of a continuous conductance heat pipe (CCHP) disposed on a surface of the evaporator saddle 39. For example, as seen in FIG. 11, a flat surface 195 of a CCHP condenser saddle 198 may be disposed on the first substantially flat surface 68 of the evaporator saddle 39. Additionally or alternatively, the heat transfer apparatus may include a CCHP evaporator saddle 202 disposed in contact with the condenser saddle 49, as seen in FIG. 12.

Because the first and second evaporators 43, 46 are housed in the single evaporator saddle 39, the first and second evaporators 43, 46 are relatively close to one another, compared to evaporators of a pair of independent loop heat pipes placed immediately adjacent one another. The relative proximity of the evaporators 43, 46 to one another allows the flat surface of the CCHP condenser saddle 198 (FIG. 11) to have relatively short flanges, reducing the overall weight of the heat transfer system. Also, the heat conductance path from the evaporators 43, 46 to the CCHP condenser saddle 198 is relatively short compared to the heat conductance path in conventional redundant heat transfer systems having a separate evaporator saddle for each evaporator. The shorter heat conductance path results in improved heat dissipation efficiency over the conventional redundant heat transfer systems.

A part of a CCHP may be placed in contact with any of the evaporator saddles of FIGS. 2, 7, and 9 or with any of the condenser saddles of FIGS. 4 and 8. A heat producing unit such as an electronic box may be placed in contact with the evaporator saddle 39 instead of a CCHP.

Figure 13:
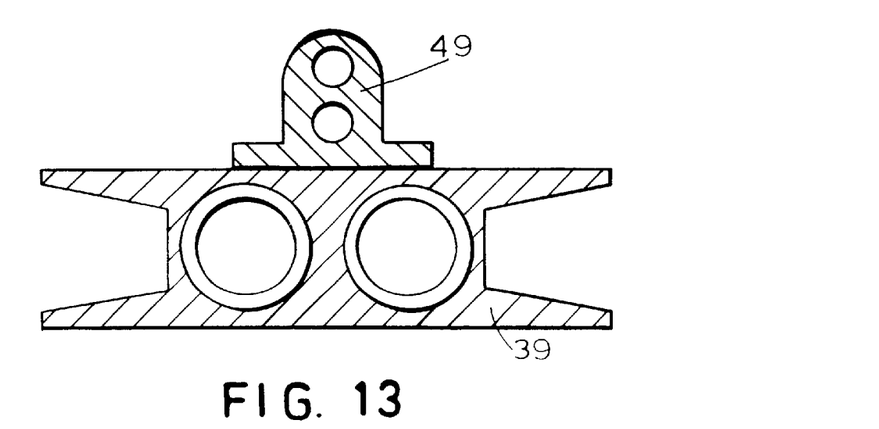
FIG. 13 is a sectional view of a condenser saddle in accordance with the present invention in contact with an evaporator saddle in accordance with the present invention.

Referring to FIG. 13, heat transfer systems in accordance with the present invention may comprise the evaporator saddle 39 of a first apparatus 30 in contact with the condenser saddle 49 of a second apparatus 30. Thus, the condenser saddle 49 of the second apparatus 30 acts as a heat source for the evaporators of the first apparatus 30.

Heat transfer systems in accordance with the present invention may include a plurality of condenser saddles 49, from a plurality of respective apparatuses 30, in contact with the evaporator saddle 39 of the first apparatus 30. Additionally or alternatively, a plurality of evaporator saddles 39, from a plurality of respective apparatuses 30, may be disposed in contact with the condenser saddle 49 of the first apparatus 30.

Heat transfer systems in accordance with the present invention may include a plurality of condenser saddles, from a plurality of respective CCHPs, in contact with the evaporator saddle 39 of the first apparatus 30. Additionally or alternatively, a plurality of evaporator saddles, from a plurality of respective CCHPs, may be disposed in contact with the condenser saddle 49 of the first apparatus 30.

The above detailed description is provided for clearness of understanding only and no unnecessary limitations therefrom should be read into the following claims.

What is claimed is:

1. Apparatus for transporting heat from a heat source comprising:
    a flexible first loop heat pipe having a first evaporator and a first condenser;
    a flexible second loop heat pipe having a second evaporator and a second condenser, said second loop in parallel with and fluidically independent from said first loop;
    an evaporator saddle having a first bore housing the first evaporator and a second bore housing the second evaporator, said evaporator saddle having a fist substantially flat surface thermally coupling the evaporator saddle to the heat source, the first bore and the second bore are disposed so that a plane bisecting the first bore and the second bore are substantially parallel to the first substantially flat surface of the evaporator saddle;
    a condenser saddle having a first bore and a second bore, said condenser saddle having a second substantially flat surface thermally coupling the condenser saddle to a radiator flat surface,
    a first vapor transport line in fluid communication with the first evaporator;
    a second vapor transport line in fluid communication with the second evaporator,
    a first reservoir in fluid communication with the first evaporator; and
    a second reservoir in fluid communication with the second evaporator.

2. The apparatus of claim 1 wherein the evaporator saddle comprises four flanges and the condenser saddle comprises two flanges.

3. The apparatus of claim 1 wherein:
    the evaporator saddle comprises a substantially flat surface; and
    the bores of the evaporator saddle are disposed so that a plane bisecting both bores is substantially perpendicular to the flat surface of the evaporator saddle.

4. The apparatus of claim 1 and comprising a continuous cooling heat pipe disposed in contact with a surface of the evaporator saddle.

5. The apparatus of claim 4 and comprising a continuous cooling heat pipe disposed in contact with a surface of the condenser saddle.

6. The apparatus of claim 1 and comprising a plurality of condenser saddles in contact with the evaporator saddle.

7. The apparatus of claim 1 and comprising a plurality of evaporator saddles in contact with the condenser saddle.

8. The apparatus of claim 7 and comprising a plurality of condenser saddles in contact with the evaporator saddle.

9. An apparatus as recited in claim 1 further comprising a second substantially flat surface of said evaporator saddle opposing the first substantially flat surface of said evaporator saddle.

10. Apparatus for tansporting heat from a spacecraft having a heat source and a radiator, the apparatus comprising:
    a first loop heat pipe having a first evaporator, a first compensation chamber and a first condenser;
    a second loop heat pipe having a second evaporator, a second compensation chamber and a second condenser, said second loop in parallel with and fluidically independent from said first loop;
    an evaporator saddle having a first bore housing the first evaporator and a second bore housing the second evaporator, said evaporator saddle having a first substantially flat surface thermally coupling the evaporator saddle to the heat source, the first bore and the second bore are disposed so that a plane bisecting the first bore and the second bore are substantially parallel to the first substantially flat surface of the evaporator saddle, said evaporator saddle comprising four flanges;
    a condenser saddle having a first bore and a second bore said condenser having a second substantially flat surface thermally coupling the condenser saddle to a radiator, said condenser saddle comprising two flanges;
    a first vapor transport line in fluid communication with the first evaporator;
    a second vapor transport line in fluid communication with the second evaporator;

a first reservoir in fluid communication with the first evaporator; and a second reservoir in fluid communication with the second evaporator.

11. The apparatus of claim 10 wherein:

the evaporator saddle comprises a substantially flat surface; and the bores of the evaporator saddle are disposed so that a plane bisecting both bores is substantially perpendicular to the flat surface of the evaporator saddle.

12. The apparatus of claim 10, and comprising first and second vapor transport lines in fluid communication with the first and second evaporators, respectively.

* * * * *